Aug. 28, 1945.   W. R. DRAY   2,383,911
THRESHER MACHINE
Filed Nov. 6, 1941
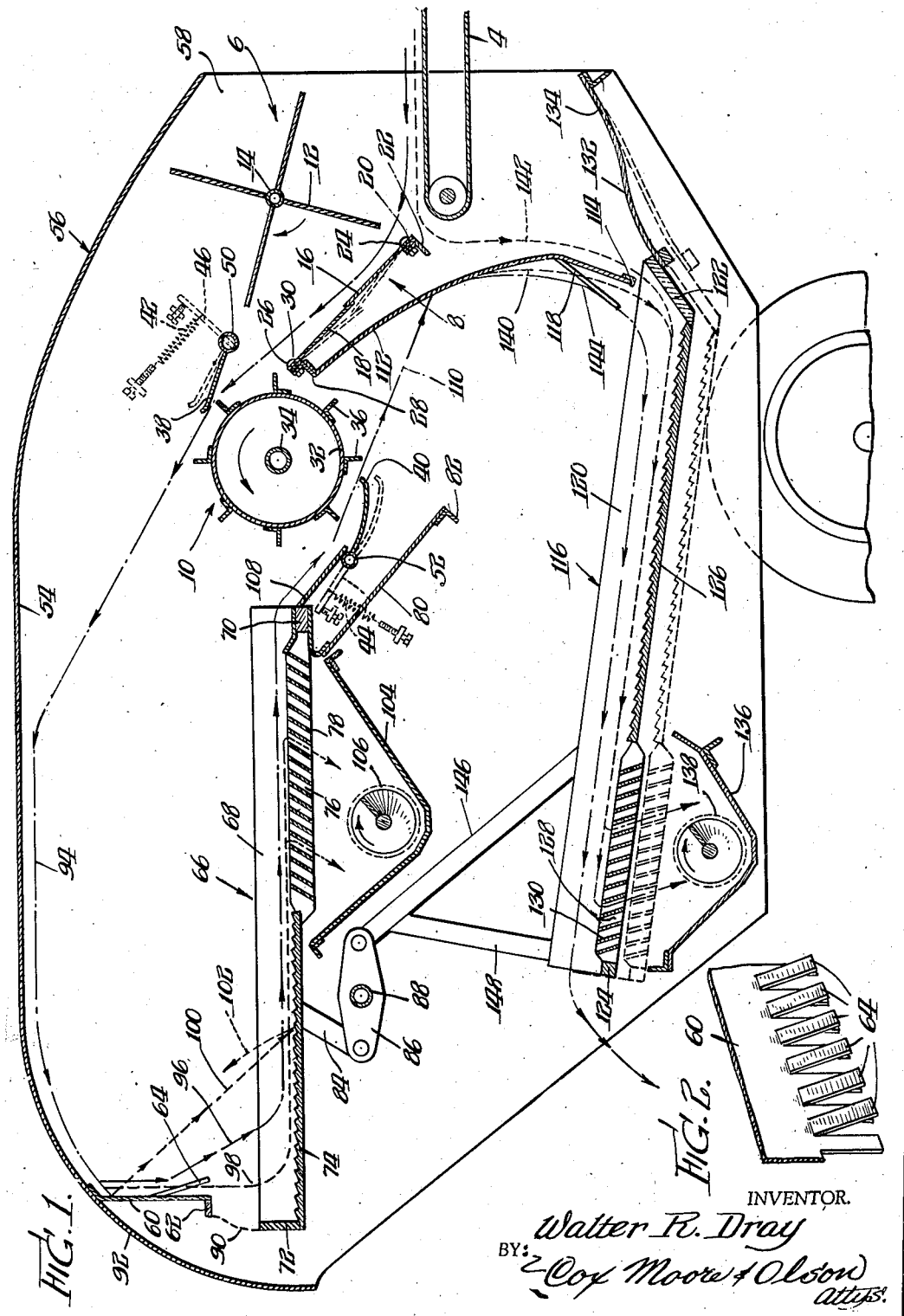
INVENTOR.
Walter R. Dray
BY: Cox Moore & Olson
Attys.

Patented Aug. 28, 1945

2,383,911

UNITED STATES PATENT OFFICE 2,383,911

THRESHER MACHINE

Walter R. Dray, Yorkville, Ill.

Application November 6, 1941, Serial No. 418,058

11 Claims. (Cl. 130—27)

This invention relates to a threshing machine.

It is an important object of this invention to provide a machine by which substantially all kinds of crops may be threshed without jamming or slugging the threshing cylinder.

A further object of the invention is to provide in a threshing machine crop feeding means capable of accommodating heavy masses of crops without clogging.

A further important object of the invention is to provide a machine for more efficiently threshing grain while at the same time minimizing the cracking of the threshed grain by the threshing mechanism.

Applicant further contemplates the provision or incorporation, in a threshing machine, of improved means for separating the grain from the threshed crop, and for selectively directing the grain and threshed crops onto grain conveying and separating means to effect a more efficient utilization of the conveyor and separator in separating the grain from the threshed crops.

Other objects of the invention are to provide a threshing machine, including a threshing mechanism or cylinder which may be driven at relatively low speed to reduce the cracking of the grain while at the same time effectively and efficiently threshing the grain; to provide in a threshing machine means for returning the unthreshed crop to the threshing mechanism or cylinder to complete the threshing of the crop; to provide a threshing mechanism wherein the crop is first subjected to a relatively gentle threshing action to thresh, without cracking, those pods or heads which thresh easily, and, after separation of the berries or grain, the crop subjected by the same threshing mechanism to a relatively severe threshing action to thresh the remaining unthreshed pods or heads which are not easily threshed; to provide in combination with a threshing cylinder or the like "concaves" or striker plates so constructed that heavy masses of crops may be fed into the machine without danger of slugging the threshing cylinder, or the like; to provide a threshing mechanism wherein the material is struck out once as it passes through the mechanism and substantially all of the loose grain threshed by this striking of the material is discharged from the threshing mechanism without being restruck, so that cracking of the grain will be minimized; to provide in a threshing machine a crop feeder including yieldable crop directing means to accommodate heavy masses of crops, while at the same time maintaining lighter masses of crops in such relation to the feeder element as to insure proper and efficient feeding of these lighter masses to a threshing mechanism; to provide in a threshing machine means for directing the threshed grain onto conveying and separating means beneath the crop to effect more efficient separation of the grain from the crops by conveyors and separators of more compact construction; to provide in a threshing machine grain and straw or crop directing, conveying and separating means wherein grain directed or projected onto the conveyor is caused to "bounce" or be projected opposite to the direction of conveyance and thereby prevented from "bouncing" or being projected beyond a separator; to provide a threshing machine wherein the grain and straw or crop always travels in the direction of the wind or air stream created by the movable threshing member or cylinder, and the wind thus created utilized to hold the grain or crops, particularly the light, fluffy crops or particles of straw, on, or in proper feeding relation to, the conveyor and separator; and to provide a threshing machine wherein the crops is threshed and rethreshed by the same mechanism, and the threshed grain separated from the crop between the successive threshing operations.

Other and further objects of the invention will be apparent from the following description when taken in connection with the accompanying drawing:

Figure 1 is a fragmentary view in longitudinal section through a threshing machine embodying the invention; and Figure 2 is a fragmentary view in perspective and partly in section of a crop directing and grain separating member forming a part of the threshing machine in Figure 1.

As shown in the drawing, a threshing machine which forms one embodiment of the present invention comprises a conveyor 4 of any appropriate conventional structure for feeding the crop material or crops into the threshing machine and to the feeder means 6. As will presently appear, the conveyor 4 preferably terminates in advance of the crop director or baffle 8, which forms part of the feeder means 6, and along which the crop or crop material is fed into the threshing mechanism 10 by the rotary feeder element 12. This feeder element 12 may be of any suitable conventional structure which may, for example, comprise radial bats radiating from a central driving shaft 14.

The crop director or baffle 8 is formed of a resilient sheet metal plate or plates, preferably a resilient sheet metal plate 16 overlying at its inner edge the complementary edge of a similar, rear plate 18. The plate 16 is mounted at its forward edge on a resilient rubber pad or bar 20, the plate and pad being fastened to and supported by an angle bar or bracket 22 as by bolts 24. The plate 18 is similarly mounted on a rubber pad or block 26 and, with the pad, is fastened to an angle bar or bracket 28 as by bolts 30. The resiliency of the plates 16 and 18 and the resiliency of their supporting rubber blocks 20 and 26 permit yielding of the plates to accommodate heavy masses of crops delivered to the feeder means by the conveyor 4. The plates 16 and 18 are, however, of such stiffness as to maintain smaller and normal masses of crops in proper feeding engagement with the feeder element 12. The threshing mechanism 10 preferably comprises a threshing cylinder 32 of suitable known construction and mounted in the usual manner on a driving shaft 34. The cylinder 32 is provided with angularly spaced, radially extending thresher bars 36. The threshing mechanism comprises, in addition, a pair of "concaves", beater or thresher plates 38 and 40 disposed in spaced relation radially or diametrically of the cylinder 32, and constructed to yield under heavier masses of crop or straw. The plates 38 and 40 may be formed of resilient sheet metal, and, in addition, may, if desired, be held in their normal inner position with respect to the cylinder by springs 42 and 44, each secured at one end by a stationary part of the machine, and at its other end to a lever or crank 46 or 48 secured to the shaft or hanger 50 or 52 on which the plate is mounted. Adjustable stops 51 and 53 may be used to determine the movements of the plates 38 and 40 toward the cylinder 32.

The thresher plates 38 and 40 are so designed that the threshing action on the crop fed between the cylinder and plate 38 is relatively gentle while the threshing action on the crop, as it passes between the cylinder and plate 40, is relatively severe. Thus, pods or heads, which can be easily threshed, will be threshed without cracking when fed between the cylinder and plate 38, while those heads or pods, which are difficult to thresh, will be subjected to a severe threshing action when the crop is passed between the cylinder and plate 40. The plate 38 may, accordingly, be substantially flat or smooth, while the plate 40 may be concave throughout, or curved upwardly and somewhat sharply at its front side or edge, and, if desired, provided with bars or teeth to increase the severity of the rethreshing action.

As the crop material passes the thresher cylinder, the bars 36 thereof slap the stalks against the plate 38, causing the berries or grain to fall out of the pods or heads or loose pods to strike against this plate 38, thereby opening the pods and releasing the berries or grain. In the conventional types of threshing mechanisms employing rigid concaves, the latter are provided with bars or teeth for rearranging the material as it passes over the concaves in an effort to subject all of the pods of the introduced material to the threshing action of the threshing bars and concaves. Such bars or teeth cut up the straw and green material and impose an additional heavy load on the cylinder in rolling, packing, tearing, and grinding the material. The threshing cylinder has a factor of safety which is often exceeded, especially when a threshing machine is used in a combine, and frequent failure of the threshing cylinder is the result. The threshing cylinder must be driven at a high peripheral speed in those types of threshing mechanisms to knock out a sufficiently high percentage of the grain, for the material or straw cushions many of the pods. However, after the grain has been threshed, it is very likely to be cracked if again hit by the threshing bars. The bouncing back of the threshed grain from the concaves subjects the grain to the likelihood of being cracked on being again hit by the threshing bars. In the threshing mechanism disclosed herein, the "concave," beater or thresher plate 38 is so dimensioned and so positioned in respect to the threshing cylinder, that material once struck by the threshing bars against the plate 38 is thus thrown rearwardly clear of the threshing cylinder and bars, and therefore there is little likelihood of any threshed grain being struck a second time by the threshing bars. The speed of the threshing cylinder can be, and preferably is, relatively low, because of the re-threshing. The yielding of the plate 38 prevents overloading of the threshing cylinder. The threshing cylinder and the wind produced by the fan action of the cylinder projects and blows the material, including the straw, chaff and grain, approximately along the line of the arrows in Figure 1 against the roof 54 of the housing 56. The housing 56 may be of any suitable form providing open front and rear walls, the roof or top wall 54 and the side walls as 58.

A material directing and separating baffle plate 60 depends from the roof 54 adjacent the rear open wall of the housing. This plate may be formed of sheet metal welded or otherwise fastened to the roof 54 and secured at its lower end to a cross bar 62. The lower portion or half of the plate 60 is formed with spaced forwardly inclined fingers or bars 64, preferably formed integrally with the plate 60.

A conveyor and cleaner or separator 66 extends longitudinally of the housing from a point below the plate 60 forwardly to a point somewhat to the rear of the threshing cylinder. This conveyor and cleaner comprises a frame formed of spaced side bars 68 (of which one only is shown), a forward cross bar 70, and a rear cross bar 72. A conveying rack 74 is mounted in the rear half of the frame and extends to a honeycomb conveying and separating rack 76, of which the transverse spaced partitions 78 are sharply inclined to the vertical, so that grain and chaff may fall freely through this rack sieve while the straw or unthreshed crop will be conveyed forwardly thereby and returned to the threshing mechanism 10.

At its front end the rack frame is mounted on a resilient plywood panel 80 secured at its forward edge to a transverse angle iron or supporting bracket 82. Intermediately, the conveyor and cleaner 66 is secured to a link or links 84, each pivoted at its lower end by a rocker 86 secured to a rocker shaft 88. The shaft 88 may be oscillated by any suitable, conventional driving mechanism (not shown). As the shaft 88 is oscillated, the conveyor and cleaner 66 is oscillated or moved along a generally elliptical path.

A short, flexible curtain 90 may extend between the cross bar 62 of the baffle plate 60 and the rear wall 72 of the conveyor and cleaner 66 to prevent chaff or other small particles from being blown out of the machine. As the material, including the straw, chaff, and grain, is moved rearwardly along the roof 54, it is directed by the downwardly sloping or rear curved portion 92 of the roof, downwardly along the directing and separating plate 60. The straw is diverted forwardly at relatively sharp angles by the fingers 64, while the straw and chaff pass between its fingers and fall directly upon the serrated conveying rack portion 74. Thus it will be seen that the bulk of the grain falls on the rack portion 74 underneath the straw, and is fed forwardly by the rack portion 74, while still underneath the straw, to the sieve portion 76. This greatly facilitates the conveyance of the grain forwardly, for the straw is utilized to quiet down the grain to prevent successive bouncing of the grain on the rack portion 74. This also facilitates the separation of the grain from the straw both by the rack portion 74 and by the sieve portion 76, for the bulk of the grain being beneath the straw and being quieted down before the grain has traveled very far along the rack, a greater portion of the rack is available to sift the grain from the straw, and, when the grain reaches the sieve portion 76, it merely drops therethrough while the straw passes forwardly. The bulk of the grain being underneath the straw, passes freely through the sieve portion 76.

In Figure 1 of the drawing, the dot-and-dash line 94 indicates the approximate path of the straw or crop, chaff and grain from the threshing mechanism 10 along the roof of the housing; the dot-and-dash line 96 indicates the approximate path of the straw as it passes downwardly from the roof and along the conveyor and cleaner 66 back to the threshing mechanism; the dash line 98 indicates the appoximate path of the bulk of the grain as it passes downwardly through the fingers 64 of the directing and separating plate 60 onto and along the rack portion 74 and through the sieve 76. The dash line 100 indicates the approximate path of a certain small portion of the grain which, in striking the face of the directing and separating plate 60 bounces forwardly and downwardly onto the rack portion 74. It should be noted that the slight amount of the grain, which follows the path 100, bounces backwardly off the serrated surface of the rack portion 74 along the path approximately indicated by the dash line 102. Since this grain bounces backwardly, it returns to the rack portion 74, and bouncing of the grain over the sieve part 76 is thus precluded.

It should be further noted that the wind or air stream created by the movable member or cylinder of the threshing mechanism, is directed by the roof 54 and plate 60 in the same direction as the crop, and this wind, therefore, facilitates the conveyance of the crop. The wind or air stream being thus directed downwardly onto, and forwardly of, the conveyor and separator 66 urges the light, fluffy straw or crop, chaff and grain downwardly onto, and forwardly with, the conveyor and separator. Eddy currents set up by the rearward propelling action of the cylinder at the plate 38 and the forward sucking action of the cylinder at the plate 40, have of course downward components of motion above the conveyor and separator 66, and, in similar manner, hold the light, fluffy straw or crop, grain and chaff on the conveyor or separator.

Beneath the sieve portion 76 there is provided a receptacle for the separated grain and chaff, this receptacle being formed by a sheet metal trough 104 secured to the housing 56 or the frame of the machine in any convenient manner. A feed auger 106 of any suitable construction extends into the trough 104 and feeds the grain and chaff into any desirable form of cleaner or into any appropriate receptacle from which the grain and chaff is extracted, and subsequently introduced into a cleaner for the separation of the grain from the chaff.

The conveyor and cleaner 66 returns the straw or unthreshed portions of the crop, with any unthreshed pods, to the threshing mechanism 10 and between the threshing cylinder 32 and the "concave," beater or thresher plate 40.

A transverse inclined baffle or directing plate 108 may extend between the conveyor and cleaner 66 to the plate 40. The threshing cylinder 32 and the threshing plate 40 now complete the threshing of the crop. The threshing cylinder and the wind or stream of air produced by the cylinder project the straw, chaff and grain along a path approximately indicated by the dot-and-dash line 110. A directing and separating baffle plate 112 extends transversely of the housing beneath the crop director or baffle 8 and from the angle iron or bracket 28, to which it is secured at its upper end to a transverse bar 114, to which it is secured at its lower end, the bar 114 extending in juxtaposition to a second conveyor and cleaner or separator 116. The baffle plate 112 is preferably curved in such fashion as to direct the straw, chaff and grain downwardly onto the conveyor and cleaner 116 with a component of motion in a direction rearwardly of the machine. The lower portion of the baffle plate 112 is provided with straw directing and separating fingers 118 similar to the fingers 64 and similarly formed.

The conveyor and cleaner or separator 116 may be similar in construction to the conveyor or cleaner and separator 66, comprising a rack frame formed of spaced, side bars 120 (of which only one is shown), a forward cross bar 122 and a rear cross bar 124. A conveyor or rack 126 extends between the side bars 120 in the forward portion of the frame and to a separating, honeycomb rack or sieve 128 having transverse projections 130 sharply inclined to the vertical. At its forward end the frame of the conveyor or separator 116 is mounted on a flexible plywood panel 132 secured at its forward end to a transverse angle bar or bracket 134.

The wind or air stream created by the threshing cylinder is directed downwardly onto the conveyor and rearwardly of the machine by the baffle 112. Therefore, as previously noted with reference to the conveyor and separator 66, this wind or air stream facilitates the conveyance of the straw, grain and chaff by the conveyor and separator 116, and holds the light, fluffy straw, chaff and grain on this conveyor and separator 116 during conveyance.

A sheet metal trough 136 extends transversely of the housing below the rack sieve 128 to form a receptacle for the grain and chaff passing through the sieve. A feed auger 138 extends into the trough and extracts the grain and chaff therefrom, and feeds it to any suitable receptacle or feed mechanism carrying the grain and chaff to a suitable cleaner.

In Figure 1 of the drawing, the dash line 140 approximately indicates the path of the grain directed downwardly by the baffle plate 112 and passing between the fingers 118 onto the conveying rack portion 126 of the conveyor and cleaner 116; along the rack portion 126 and through the sieve portion 128.

It should be noted that the conveyors and cleaner or separator 116 extends forwardly beyond the lower end of the baffle plate 112 to receive from the conveyor 4 any grain, chaff, or other small particles which, included in the crop fed to the threshing machine, falls from the surface of the conveyor and passes along the dash line 142 into the space between the forward end of the crop director 8 and the rear end of the conveyor. The grain directed onto the rack portion 126 by the baffle plate 112 along the path indicated by the line 140 and the grain falling from the conveyor along the path indicated by the line 142 are received on the rack portion 126 beneath the straw, which is directed by the fingers 118 along the path approximately indicated by the dot-and-dash line 144. The directing of the grain onto the conveyor and cleaner beneath the straw facilitates the conveying and separation of the grain in the manner as explained with respect to the similar conveyor and cleaner or separator 66.

The conveyor and cleaner or separator 116 is moved or oscillated along an elliptical path by the rocker 86, which is connected to the frame of this conveyor and cleaner or separator by means of one or more links or pitmans 146 each secured to a side bar 120 at a point intermediate the ends thereof, and one or more brace bars 148 each extending from the rear end of a side bar 120 to the complementary link or pitman 146.

It will be seen that the crop is threshed by first feeding the crop to the threshing device to effect a partial threshing of the grain by a relatively gentle threshing action to thresh the more easily threshed head or pods without cracking of the grain or berries; then the grain is separated from the crop; the crop is returned to the threshing mechanism for a second threshing by a relatively severe threshing action to complete the threshing of the crop, or the head, or pods which are difficult to thresh; the grain threshed by this second operation is separated from the crop, leaving only a completely threshed straw, and this completely threshed straw is discharged through the open rear of the machine from the rear end of the conveyor and cleaner or separator 116, as is usual in combines of the conventional type.

It should also be observed that, prior to the first threshing operation, loose grain in the crop or crop material is separated from the crop and collected with the grain from the second threshing operation so that grain or berries will be hit or subjected to a threshing operation only when in their sheaths or pods.

The term "crop" or "crop material" is employed to designate the heads, pods, seeds and fruit bearing stalks, or portions thereof, with or without the fruit, seed or grain thereon, which are being or are destined to be threshed. The term "grain" is intended to include the seeds of cereals, peas, beans, and the like, and the term "straw" or "stalks" is employed to designate the threshed stalks of the crop material.

Changes may be made in the form, construction and arrangement of the parts without departing from the spirit of the invention or sacrificing any of its advantages, and the right is hereby reserved to make all such changes as fairly fall within the scope of the following claims.

Having thus described my invention what I claim as new and desire to secure by Letters Patent is:

1. In a single threshing machine, a threshing cylinder, a pair of threshing plates in angularly spaced relation about said cylinder, means for feeding crop material to be threshed to the cylinder between the cylinder and one of said threshing plates, means receiving the once threshed crop material for separating the grain and returning substantially all of the remaining once threshed crop material to said cylinder between the cylinder and the other threshing plate, means receiving the twice threshed crop material from the threshing cylinder for separating said grain from said twice threshed crop material and discharging the straw from the machine, means for directing the once threshed crop material and grain to the remote end of the first separating means, and means for directing the twice threshed crop material and grain to the proximate end of the second separating means.

2. In a threshing machine, a threshing cylinder, means cooperating with said cylinder for threshing grain, means providing a ceiling wall against which the grain and threshed material is projected from the threshing cylinder, a conveyor and grain separator beneath said ceiling wall, a baffle plate depending from said ceiling wall for directing material and grain onto said conveyor and separator, said baffle plate having spaced directors separating the grain from the threshed material and passing the grain to the conveyor and separator while directing the threshed material forwardly onto the conveyor and separator so that the grain is deposited on the conveyor and separator beneath the threshed material, threshing means cooperating with said cylinder for re-threshing the threshed material, and means for conducting the threshed material back to said threshing cylinder and last-named means.

3. In a threshing machine, a threshing mechanism comprising a threshing cylinder and cooperating means providing spaced threshing surfaces between which cylinder and surfaces the crop material is fed for threshing, means for feeding the material to be threshed to said mechanism between said cylinder and one of said surfaces, means receiving the grain and partially the threshed crop from the cylinder and said one surface for separating the loose grain from the crop material, and means for directing substantially all of partially threshed crop material except said loose grain between said cylinder and the other of said surfaces, said cylinder and surfaces being constructed and arranged to exert a relatively gentle threshing action on the material when between said cylinder and said one surface and a relatively severe threshing action when between said cylinder and said other surface.

4. In a threshing machine, a threshing cylinder including threshing bars extending outwardly from said cylinder throughout its length, means for rotating said cylinder so that the bars on the upper side thereof move rearwardly, a threshing plate above said cylinder in proximity thereto, means for resiliently biasing said plate toward said cylinder, a threshing plate beneath said cylinder, means for resiliently and adjustably biasing said last-named plate toward said cylinder, means for feeding crop material between said cylinder and first-named plate, means for separating the loose grain from the crop material and for feeding the threshed crop material between said cylinder and second-named plate, and means for separating the grain from the second threshed crop material and for discharging the second threshed crop material from the machine.

5. In a threshing apparatus, threshing mechanism for threshing crop material, means for separating grain threshed from said material, means for rethreshing the threshed material, means for separating grain from the rethreshed material, said threshing mechanism comprising a cylinder having threshing bars thereon, a smooth hinged threshing plate adjacent the upper portion of said cylinder and a lower smooth concave threshing plate provided adjacent the lower portion of said cylinder, resilient means for pressing said plates toward said cylinder, and means for adjusting the tension of said resilient means.

6. In a threshing mechanism, a cylinder having threshing members thereon, a threshing plate movably mounted and having a free end adjacent to one portion of said cylinder, said free end being curved away from said cylinder, a concave threshing plate movable toward and from said cylinder at the side opposite said first-named threshing plate, the free end of said second-named plate curving upwardly on a comparatively short radius whereby material entering between the cylinder and first-named plate will be mildly threshed and that entering between said cylinder and last-named plate will be severely threshed, and means for yieldably biasing said plates toward said cylinder.

7. In a threshing machine, a threshing cylinder, a pair of threshing elements in angularly spaced relation about said cylinder, means for feeding crop material to be threshed to said cylinder between the cylinder and one of said threshing elements, grain separator means separated from, and supported and operated independently of, said cylinder and elements for receiving the once threshed crop material separating the grain and returning the once threshed crop material to said cylinder between the cylinder and the other threshing element, and means receiving the twice threshed crop material from the threshing cylinder for separating the grain from said twice threshed crop material and discharging the straw from the machine.

8. In a threshing machine, a threshing mechanism including a threshing cylinder, means for feeding unthreshed crop material to said mechanism over said cylinder, means rearwardly of said cylinder for receiving the threshed crop and grain from the threshing mechanism for separating the grain from the threshed crop, means for feeding substantially all the threshed material to the threshing mechanism below said cylinder except the separated grain, separating means rearwardly of said cylinder for separating the loose grain from the threshed material discharged from below said cylinder said first-named feeding means being constructed to feed loose grain in the crop material directly to said last-named separating means, said cylinder rotating so that the upper portion moves rearwardly.

9. In a threshing machine, threshing mechanism comprising a single threshing cylinder having threshing bars thereon, cooperating threshing members above and below said cylinder between which and said cylinder crop material is threshed and rethreshed, means for feeding the crop material through said mechanism rearwardly at the upper side of said cylinder, separating means, means for operating said last named means independently of said mechanism for separating the loose grain from the threshed crop material after its first passage through said threshing mechanism, means including said separating means for refeeding the threshed material except said loose grain back to said threshing mechanism from the rear at the lower side of said cylinder, separating means for separating grain from the rethreshed crop material, and means for discharging the rethreshed crop material from the machine.

10. In a threshing machine, threshing mechanism including a single threshing cylinder, means for conducting crop material to said mechanism substantially tangentially over said threshing cylinder for threshing the same, said mechanism discharging the threshed crop material substantially horizontally and rearwardly, movable separator and conveying means positioned rearwardly of said cylinder, means for operating said separator and conveying means for removing the loose grain from the threshed crop material and for feeding the latter substantially horizontally and forwardly through said mechanism below said cylinder for rethreshing the same, means for reversing the direction of movement of said rethreshed crop material, a second movable separator and conveying means, and means for operating the last named means for separating the loose grain from the rethreshed crop material and for moving the rethreshed crop material toward the rear of the machine.

11. In a threshing machine, a threshing mechanism including a single cylinder and a pair of threshing members spaced angularly substantially 180° about said cylinder, one substantially above and the other substantially below the axis of said cylinder, means for conducting crop material to said mechanism between said cylinder and one of said members for threshing said crop material, movable separator and conveying means spaced rearwardly from said cylinder, means for operating said separator and conveying means for removing the loose grain from the threshed crop material and for feeding the latter back to said mechanism between said cylinder and the other of said members for rethreshing the same, a second movable separator and conveying means, and means for operating said second separator and conveying means for separating the loose grain from the rethreshed crop material and for moving the rethreshed crop material toward the rear of the machine.

WALTER R. DRAY.